United States Patent [19]
Mitobe et al.

[11] Patent Number: 4,740,011
[45] Date of Patent: Apr. 26, 1988

[54] SUSPENSION FOR MOTOR VEHICLES

[75] Inventors: Keiichi Mitobe; Kanji Kubo, both of Tokyo, Japan

[73] Assignee: Honda Giken Kogyo Kabushiki Kaisha, Tokyo, Japan

[21] Appl. No.: 63,951

[22] Filed: Jun. 19, 1987

Related U.S. Application Data

[63] Continuation of Ser. No. 654,644, Sep. 24, 1984, Pat. No. 4,696,488.

[30] Foreign Application Priority Data

Sep. 22, 1983 [JP] Japan ................. 58-175677
Oct. 26, 1983 [JP] Japan ................. 58-200365

[51] Int. Cl.⁴ .............................. B60G 3/00
[52] U.S. Cl. ............................ 280/690; 280/701
[58] Field of Search ............... 280/690, 697, 698, 699, 280/700, 701; 180/73.3, 73.4

[56] References Cited

U.S. PATENT DOCUMENTS

| | | | |
|---|---|---|---|
| 2,845,134 | 7/1958 | Reimspiess | 180/73 |
| 3,205,967 | 9/1965 | Stotz et al. | 180/73 |
| 4,261,591 | 4/1981 | Warne, Jr. | 280/675 |
| 4,421,332 | 12/1983 | Kosak et al. | 280/701 |
| 4,650,209 | 3/1987 | Sumimoto | 280/701 |
| 4,696,488 | 9/1987 | Mitobe et al. | 280/701 |

FOREIGN PATENT DOCUMENTS

| | | | |
|---|---|---|---|
| 83183 | 7/1983 | European Pat. Off. | 280/701 |
| 136563 | 4/1985 | European Pat. Off. | |
| 1430082 | 12/1968 | Fed. Rep. of Germany | 280/701 |
| 2038880 | 2/1972 | Fed. Rep. of Germany | |
| 1425504 | 12/1945 | France | |
| 1353915 | 1/1964 | France | |
| 2094095 | 2/1972 | France | |
| 698921 | 12/1965 | Italy | 280/701 |
| 53412 | 3/1985 | Japan | 280/701 |
| 432157 | 7/1935 | United Kingdom | |
| 993383 | 5/1965 | United Kingdom | |
| 2087322 | 5/1982 | United Kingdom | |
| 2089743 | 6/1982 | United Kingdom | |

Primary Examiner—Ross Weaver
Attorney, Agent, or Firm—Armstrong, Nikaido, Marmelstein & Kubovcik

[57] ABSTRACT

A suspension for a motor vehicle has a link structure and a spring interposed between the link structure and a vehicle frame. The link structure comprises a trailing arm extending substantially longitudinally of the vehicle frame and having a front end pivotally coupled to the vehicle frame and a rear end supporting a wheel, upper and lower arms extending substantially transversely of the vehicle frame and each having one end pivotally coupled to the vehicle frame and an opposite end pivotally coupled to the trailing arm in the vicinity of a rear end thereof, and a compensation link having one end pivotally coupled to the vehicle frame and an opposite end pivotally coupled to the trailing arm. The suspension is relatively lightweight, inexpensive to construct, and has excellent performance.

8 Claims, 7 Drawing Sheets

SUSPENSION FOR MOTOR VEHICLES

This is a continuation of application Ser. No. 654,644 filed Sept. 24, 1984, now U.S. Pat. No. 4,696,488.

BACKGROUND OF THE INVENTION

1. Field of the Invention

The present invention relates to a suspension for motor vehicles, and more particularly to a motor vehicle suspension with a trailing arm.

2. Description of the Prior Art

Rear wheel suspensions for automobiles have heretofore been required to meet various requirements such as excellent riding comfort, maneuvering stability, a reduced weight, a reduced cost, and a space saving design, for example. A variety of rear suspensions have been proposed and put to use, but have had their own advantages and disadvantages. Therefore, no automotive rear suspensions have been standardized.

Conventional strut-type suspensions are advantageous in that they can distribute the load imposed thereon, are relatively lightweight, and inexpensive. However, the strut-type suspension allows frictional forces acting on a damper shaft to affect the riding comfort. The semitrailing arm has proven unsatisfactory in that it permits relatively large camber and toe variations, and takes up a large space for installation since it requires a relatively thick member to provide desired rigidity against a lateral force. The double-wishbone-type suspension is complex in construction, expensive, heavy, and requires a large installation space, though the suspension has links that can be arranged with greater freedom and has relatively good characteristics.

Figure 6:
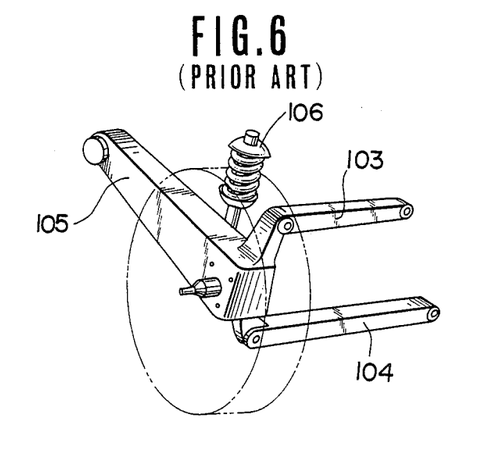
FIG. 6 is is a perspective view of a conventional suspension for a motor vehicle.

FIG. 6 shows a conventional independent rear suspension composed of a three-link mechanism comprising an upper arm 103, a lower arm 104, and a trailing arm 105, and a damper 106 with a spring. The illustrated prior independent rear suspension is lightweight, inexpensive, and a spacer saver and has as good characteristics as those of the double-wishbone-type suspension. The sole problem with this independent rear suspension, however, is that tires as they move up and down are subjected to toe-out.

SUMMARY OF THE INVENTION

The present invention has been made with a view to solving the above problem with the conventional rear suspension of the three-link arrangement.

It is an object of the present invention to provide a suspension with a trailing arm for use with a motor vehicle, the suspension being relatively lightweight, inexpensive, and free from toe-out of wheels.

To achieve the above object, according to the present invention, a suspension for use with a motor vehicle having a vehicle frame comprises: a link structure composed of a trailing arm extending substantially longitudinally of the vehicle frame, the trailing arm having a front end adapted to be pivotally coupled to the vehicle frame and a rear end adapted to support a wheel, upper and lower arms extending substantially transversely of the vehicle frame, each of the upper and lower arms having one end adapted to be pivotally coupled to the vehicle frame and an opposite end pivotally coupled to the trailing arm in the vicinity of the rear end, and a compensation link having one end adapted to be pivotally coupled to the vehicle frame and an opposite end pivotally coupled to the trailing arm; and spring means adapted to be interposed between the vehicle frame and the link structure.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4a–c are schematic diagrams of the suspension illustrated in FIG. 1, showing the relationship between the trailing arm, the wheel, the links in three orthogonal views;

DESCRIPTION OF THE PREFERRED EMBODIMENTS

Figure 1:
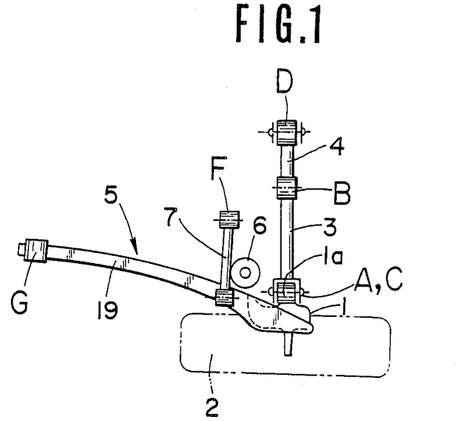
FIG. 1 is a plan view of a suspension for a motor vehicle according to a first embodiment of the present invention.
Figure 2:
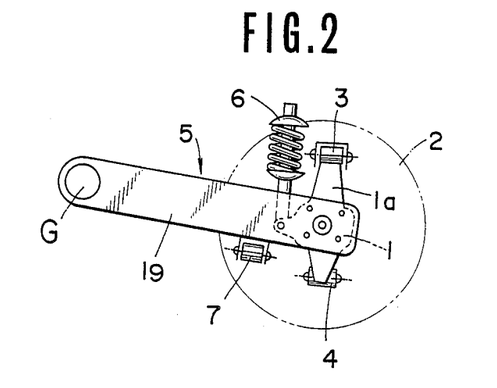
FIG. 2 is a side elevational view of the suspension shown in FIG. 1.
Figure 3:
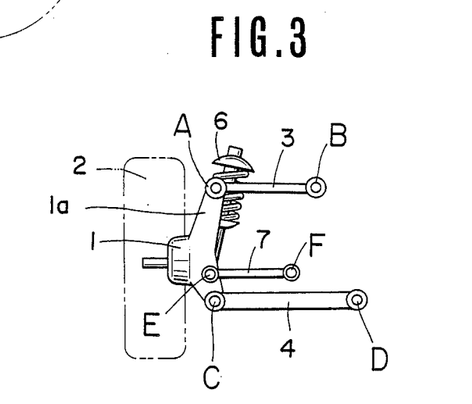
FIG. 3 is a rear elevational view of the suspension of FIG. 1.

FIGS. 1 through 3 illustrate a rear suspension for a motor vehicle (not shown) according to a first embodiment of the present invention. The suspension comprises a knuckle 1 on which a rear wheel 2 is rotatably supported, the knuckle 1 having a knuckle arm 1a. To upper and lower end of the knuckle arm 1a, there are pivotally coupled ends of an upper arm 3 and a lower arm 4 which extend substantially transversely of a vehicle frame (not shown) of the motor vehicle. The other ends of the upper and lower arms 3, 4 are pivotally coupled to the non-illustrated vehicle frame. The upper and lower arms 3, 4 are connected to the knuckle arm 1a and the vehicle frame through pivot points A, B, C, D. The lower arm 4 is longer than the upper arm 3.

An arm member 19 extends forward from the knuckle 1. The arm member 19 and the knuckle 1 jointly serve as a trailing arm 5. The trailing arm 5 has a front end pivotally coupled to the vehicle frame through a pivot point G.

A damper 6 with a spring is interposed between the knuckle arm 1a and the vehicle frame for bearing a load imposed on the wheel 2. The damper 6 and the spring may separately be provided, and may be of various types and in various positions as desired.

The rear suspension further includes a compensation link 7 of a relatively small length disposed forward of the upper and lower arms 3, 4 and having one end pivotally coupled to the trailing arm 5 through a pivot point E and an opposite end pivotally coupled to the vehicle frame through a pivot point F.

Figure 4:
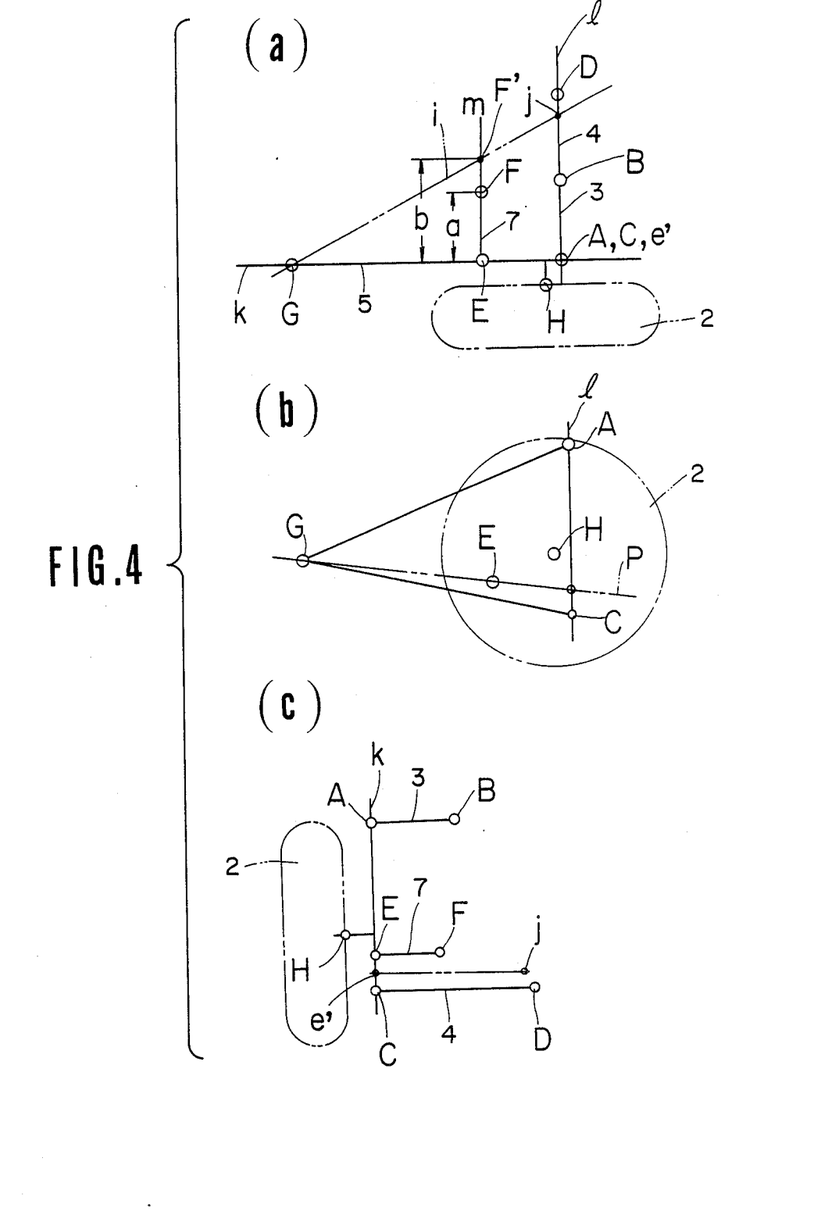

FIG. 4 schematically shows the relationship between the trailing arm 5, the wheel 2, and the link members 3, 4, 7, (a) being a plan view, (b) a side elevational view, and (c) a rear elevational view. A vertical plane k passes through the pivot point G by which the trailing arm 5 is pivotally coupled to the vehicle frame and extends vertically with respect to the vehicle frame. The pivot points A, C, E as defined above are shown as lying on the plane k since they are positioned near the plane k though they are not exactly positioned on the plane k. A vertical plane l passes through the point A and extends transversely of the vehicle frame. The points B, C, D are shown as lying on the plane l since they are positioned near the plane l though they are not exactly positioned on the plane.

As illustrated in FIG. 4(b), a straight line P passing through the points E, G and the plane l intersects plane l at a point e′. When the spring of the suspension counterbalances the load on the vehicle, the upper and lower arms 3, 4 lie substantially horizontally as shown in FIG. 4(c). The point e′ would follow a path upon angular displacement of the suspension linkage if it were not for the compensation link 7, and a portion of such a path relatively close to the balanced condition would be approximated by an arc on the plane l. The center of curvature of such an arc is denoted at j and referred to as a hypothetical center.

Points on the straight line P each follow paths, a portion of which would be approximated by arcs having centers of curvature that are positioned on a straight line i passing through the point j and the point G, since the paths of movement of the points on the straight line p are similar in shape to each other. A point F′ where a straight line m drawn parallel to the plane l from the point E and the straight line i intersect is equivalent to a hypothetical center of the point E (FIG. 4(a)).

The compensation link 7 has a length l smaller than the distance b between the points E, F′. With the compensation link 7 positioned at the point E, variations in toe due to lateral movement of the knuckle can be compensated for by the compensation link 7, so that the rear wheel 2 as it moves up and down will undergo toe-in. Therefore, the ability for the vehicle to run along a straight line can be improved.

Since the above advantage can easily be achieved by adding the compensation link 7 which is a fourth link, the rear suspension is relatively light in weight and relatively inexpensive to construct. Designated at H in FIG. 4 is the center of the wheel 2.

It is possible to change the distribution of a toe change upon up-and-down movement of the wheel 2 by varying the height of the pivot point F where the compensation link 7 is pivotally coupled to the vehicle frame.

Figure 5:
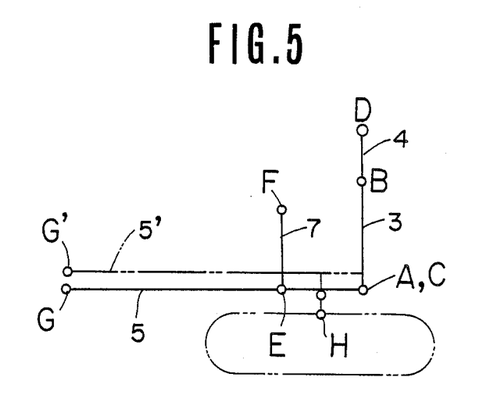
FIG. 5 is a schematic diagram of the suspension of FIG. 1, illustrative of the manner in which the suspension operates.

The foregoing arrangement will also be described with reference to FIG. 5. The lateral displacement of the point E on the trailing arm 5 at the time the wheel 2 moves up and down is limited by the compensation link 7. Therefore, the trailing arm 5 will be shifted laterally to the position 5′ without causing toe-out. It should be noted that the pivot point G where the trailing arm 5 is coupled to the vehicle frame is required to be laterally shifted to the position G′. It follows that the structure by which the trailing arm 5 is pivotally coupled to the vehicle frame through the point G should allow the trailing arm 5 to be moved laterally with respect to the vehicle frame. According to the embodiment of the invention, this requirement is met by a rubber bushing (not shown) by which the trailing arm 5 is pivotally coupled to the vehicle frame. The above requirement can however be met by various known structures which join the trailing arm and the vehicle frame pivotally while allowing them to be relatively moved laterally.

A rear suspension according to a second embodiment will be described with reference to FIGS. 7 through 10. The rear suspension of the second embodiment differs from the rear suspension of the first embodiment primarily in the arrangement of the trailing arm, and also slightly in the structure by which the trailing arm is coupled to the vehicle frame. Most of the other parts are identical to corresponding parts of the first embodiment, and hence are denoted by the same reference characters.

Figure 7:
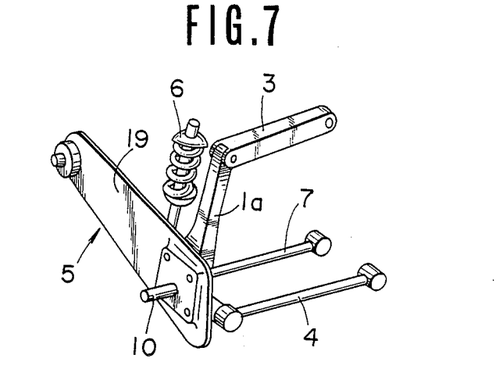
FIG. 7 is a perspective view of a suspension for a motor vehicle according to a second embodiment of the present invention.
Figure 8:
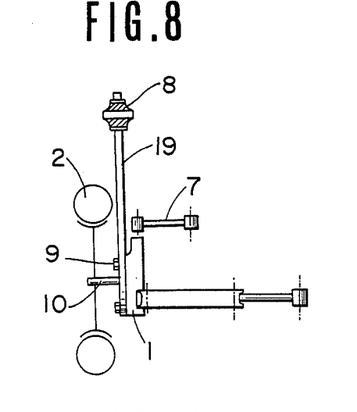
FIG. 8 is a plan view of the suspension shown in FIG. 7.

An arm member 19 has a front end pivotally coupled by a rubber bushing 8 to a vehicle frame (not shown) for vertical angular movement. The arm member 19 has a rear end to which a knuckle 1 is fastened by bolts 9. The arm member 19 and the knuckle 1 jointly constitute a trailing arm 5. A spindle 10 projects outwardly from the knuckle 1 and a wheel 2 is rotatably supported on the spindle 10.

The arm member 19 comprises a leaf spring oriented such that it has enough compliance with bending forces applied transversely of the vehicle frame and rigidity against vertical bending forces.

The knuckle 1 has a knuckle arm 1a with upper and lower ends thereof connected to ends, respectively, of upper and lower arms 3, 4 having opposite ends extending substantially transversely of the vehicle frame and coupled thereto. A compensation link 7 is disposed in front of the lower arm 4 and has one end coupled to the knuckle 1 and an opposite end to the vehicle frame. A damper 6 with a spring is interposed between the knuckle 1 and the vehicle frame.

Figure 9:
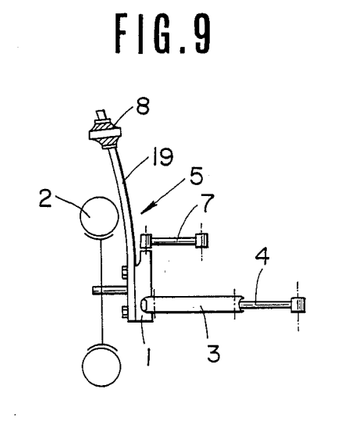
FIG. 9 is a plan view of the suspension of FIG. 7, with the wheel shown moved upwardly or downwardly.

When the wheel 2 moves upwardly and downwardly, as described with reference to the first embodiment, toe-out of the wheel 2 is prevented by lateral displacement of the trailing arm 5 as it is restrained by the compensation link 7. Since the trailing arm 5 is however elastically deformed so as to be bent transversely of the vehicle frame as shown in FIG. 9, the front end of the trailing arm 5 which is coupled to the vehicle frame is not transversely shifted or is transversely shifted over an interval much smaller than that required by the first embodiment. As a result, the extent to which the rubber bushing 8 will be deformed is so reduced that a smaller rubber bushing may be employed as the rubber bushing 8.

Figure 10:
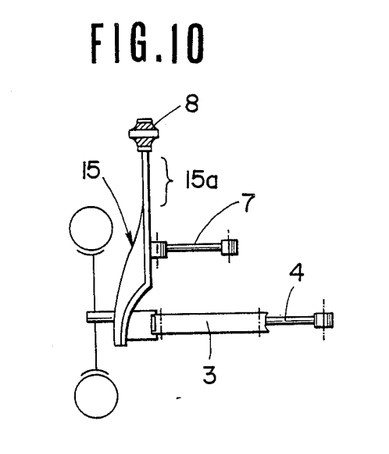
FIG. 10 is a plan view of a modification of the suspension shown in FIG. 7.

The trailing arm 5 does not need to be elastically deformed throughout its length, but only a portion thereof may have compliance. FIG. 10 shows a modification of the second embodiment in which only a front portion 15a of a trailing arm 15 has compliance in the transverse direction of the vehicle frame. The modified rear suspension will operate in the same manner as that of the rear suspension of the second embodiment.

FIGS. 11 through 16 illustrate three different trailing arms suitable for use in the rear suspension according to the second embodiment. Each of the disclosed trailing arms is composed of an arm member in the form of a steel plate and a knuckle fixed to a rear end of the arm member.

Figure 11:
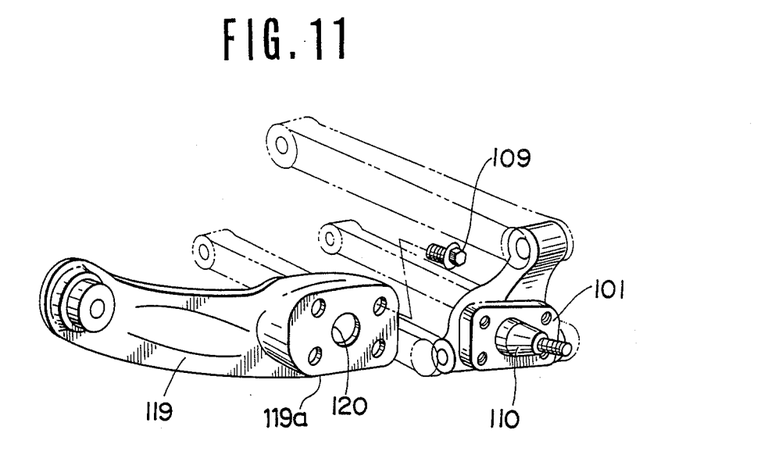
FIG. 11 is a perspective view of a trailing arm suitable for use in the suspension shown in FIGS. 7 through 9.
Figure 12:
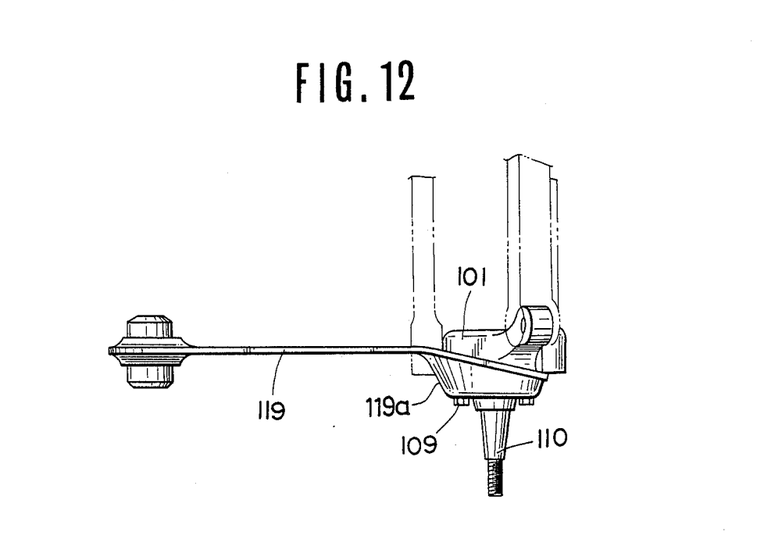
FIG. 12 is a plan view of the trailing arm illustrated in FIG. 11.

A trailing arm shown in FIGS. 11 and 12 comprises an arm member 119 having a recess 1019a defined in a rear end thereof and receiving a knuckle 101. The rear end of the arm member 119 has a hole 120 positioned in the recess 119a and through which extends a spindle 110 supported on the knuckle 101. The arm member 119 is coupled to the knuckle 101 by bolts 109. The trailing arm shown in FIGS. 11 and 12 can be manufactured relativley inexpensively and hence lends itself to mass production.

Figure 13:
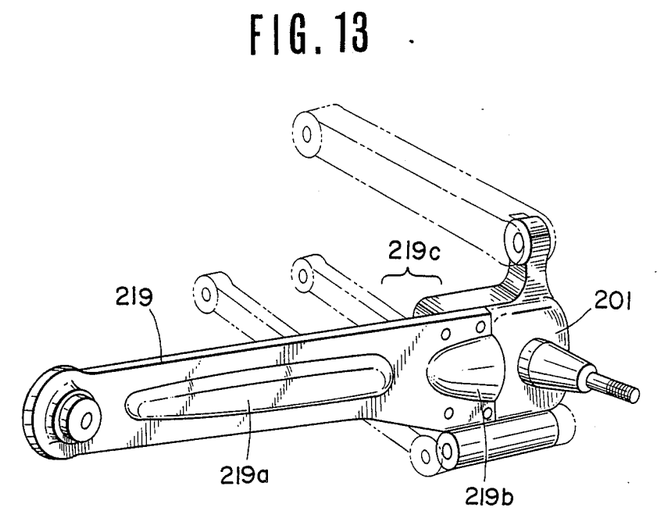
FIG. 13 is a perspective view of a trailing arm suitable for use in the modification of the suspension according to the second embodiment.
Figure 14:
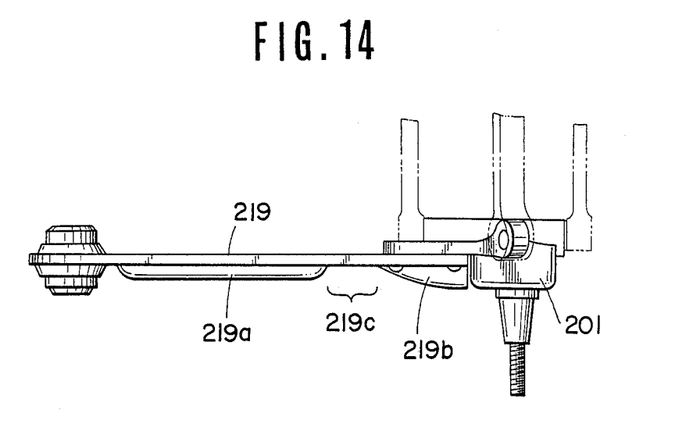
FIG. 14 is a plan view of the trailing arm shown in FIG. 13.

FIGS. 13 and 14 illustrate a trailing arm which is similar to the trailing arm shown in FIG. 10 in that only a portion of an arm member has compliance. The arm member, denoted at 219, has a first relatively long embossed portion 219a on a front area thereof and a second relatively short embossed portion 219b on a rear area thereof. These embossed portions 219a, 219b serve to increase the rigidity of the arm member 219 against bending forces applied transversely of the vehicle frame. Therefore, only an intermediate flat portion 219c of the arm member 219 between the embossed portions 219a, 219b has compliance with the bending forces. The arm member 219 has a rear end fixed to a front end of a knuckle 201.

Figure 15:
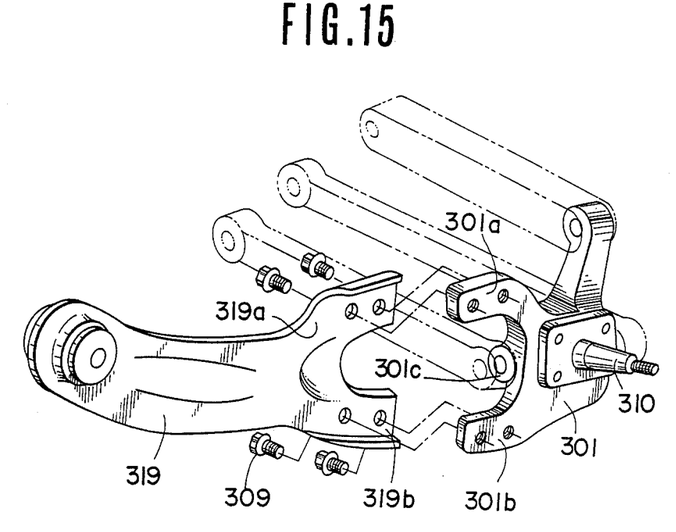
FIG. 15 is a perspective view of a trailing arm suitable for use in the suspension shown in FIGS. 7 through 9.
Figure 16:
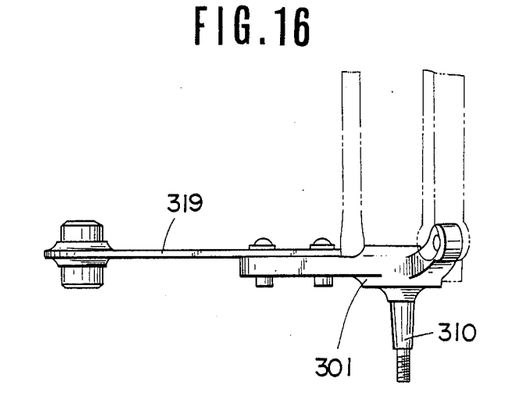
FIG. 16 is a plan view of the trailing arm illustrated in FIG. 15.

As shown in FIGS. 15 and 16, still another trailing member comprises an arm member 319 having a rear end of a bifurcated configuration including an upper projection or leg 319a and a lower projection or leg 319b. A knuckle 301 includes a front end of a bifurcated shape composed of an upper projection or leg 301a and a lower projection or leg 301b. The knuckle 301 has a boss 301c disposed on a front surface between the upper and lower legs 301a, 301b for pivotable connection to a compensation link. The upper legs 319a, 301a of the arm member 319 and the knuckle 301 are fastened to each other by bolts 309, and the lower legs 319b, 301b of the arm member 319 and the knuckle 301 are fastened to each other by bolts 309. With this trailing arm construction, a moment applied about a spindle 310 to the knuckle 301 at the time the wheel is braked, for example, is transmitted to the arm member 319 through the upper and lower legs 301a, 319a, 301b, 319b. Since these upper and lower legs are spaced relatively widely, any forces applied to the joint between the arm member 319 and the knuckle 301 are relatively small, so that the trailing arm is lightweight and is of an increased mechanical strength. Because the boss 301c of the knuckle 301 to which the compensation link is coupled is exposed between the upper and lower legs, the compensation link and the knuckle can easily be coupled together upon assembly.

Although there have been described what are at present considered to be the preferred embodiments of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A suspension system for suspending a wheel on a motor vehicle frame, said suspension system comprising:
   (a) a trailing arm extending in the longitudinal direction of the vehicle frame, said trailing arm having a front portion connected to the vehicle frame and a rear portion for supporting the wheel;
   (b) an upper link arm extending substantially transverse to the vehicle frame, said upper link arm having a first end pivotally coupled to the vehicle frame and a second end pivotally coupled to said trailing arm;
   (c) a lower link arm extending substantially transverse to the vehicle frame, said lower link arm having a first end pivotally coupled to the vehicle frame and a second end pivotally coupled to said trailing arm, said lower link arm being positioned lower than said upper link arm;
   (d) a compensation link having a first end pivotally coupled to the vehicle frame and a second end pivotally coupled to said trailing arm, the length of said compensaion link being less than the distance between the pivot point at which it is coupled to the trailing arm and a hypothetical center about which said pivot point would move upon angular displacement of the trailing arm in the absence of the compensation link; and
   (e) spring means coupled between said trailing arm and the vehicle frame.

2. A suspsension according to claim 1, wherein said trailing arm comprises an arm member having a front end pivotally coupled to the vehicle frame, and a knuckle fixed to a rear end of said arm member for supporting the wheel.

3. A suspension according to claim 2, wherein said uppr link arm, said lower link arm, and said compensation link are pivotally coupled at said second ends thereof to said knuckle.

4. A suspension according to claim 1, wherein said trailing arm is relatively flexible with respect to bending forces transverse to the vehicle frame and is relatively rigid against bending forces vertical with respect to the vehicle frame.

5. A suspension according to claim 3, wherein said arm member is relatively flexible with respect to bending forces transverse to the vehicle frame and is relatively rigid against bending forces vertical with respect to the vehicle frame.

6. A suspension according to claim 5, wherein said arm member comprises a steel plate having a recess defined in the rear end thereof for receiving said knuckle.

7. A suspension according to claim 5, wherein said arm member comprises a steel plate having a first relatively long embossed portion on a front portion thereof and a second relatively short embossed portion on a rear portion thereof.

8. A suspension according to claim 5, wherein said rear end of said arm member is bifurcated having upper and lower projections and said knuckle has a bifurcated front portion having upper and lower projections, wherein said upper projections of said arm member and knuckle are fixed to each other, and said lower projections of said arm member and knuckle being fixed to each other, and wherein said knuckle has a base disposed between said upper and lower projections thereof, said compensation link being coupled to said boss.

* * * * *